(12) United States Patent
Kring

(10) Patent No.: US 6,179,603 B1
(45) Date of Patent: Jan. 30, 2001

(54) RUBBER MOLD COLD RUNNER SYSTEM

(76) Inventor: Richard R. Kring, 3115 E. Village La., Port Huron, MI (US) 48060

( * ) Notice: Under 35 U.S.C. 154(b), the term of this patent shall be extended for 0 days.

(21) Appl. No.: 09/078,877

(22) Filed: May 14, 1998

(51) Int. Cl.$^7$ .................................................. B29C 45/22
(52) U.S. Cl. .......................................... 425/543; 425/572
(58) Field of Search ................................... 425/543, 570, 425/572

(56) References Cited

U.S. PATENT DOCUMENTS 3,776,676 * 12/1973 Kessler .................................. 425/444
4,826,416 * 5/1989 Majerus et al. ....................... 425/572
5,032,078 * 7/1991 Benenati .............................. 425/570

* cited by examiner

Primary Examiner—Tim Heitbrink

(57) ABSTRACT

An injection block for the injection molding of thermoset polymers, such as rubber, formed from at least a pair of plates bolted or otherwise releasably held together and defining an improved runner system between the plates. Complimentary grooves formed in each plate substantially completely surrounding the portion of the runner system formed between the two plates to define, when the plates are mated together, a passage or enclosure constructed to receive a sealing member therein to prevent leakage of the material to be molded beyond the sealing member between the plates. Thus, the sealing member limits the leakage or creeping of the molding material from the runners. This is believed to limit the surface area over which the relatively high pressure under which the material is molded acts between the plates to limit the force tending to separate the plates. The plates may be releasably held together by a plurality of cap screws, bolts or screws without failure in use of the injection block. Bolting the plates together is desirable because it facilitates separating them to clean them, remove molding material, or otherwise service and maintain the injection molding block throughout its life.

21 Claims, 4 Drawing Sheets

RUBBER MOLD COLD RUNNER SYSTEM

FIELD OF THE INVENTION

This invention relates generally to injection molding and more particularly to an improved method and apparatus for the injection molding of rubber thermoset polymers.

BACKGROUND OF THE INVENTION

A wide variety of thermoplastic parts are formed by injection molding. The thermoplastic material is typically heated to an elevated temperature such that the material becomes substantially molten and will flow readily under pressure into the mold. To cure the thermoplastic material, it is cooled in the mold until it is sufficiently solidified.

Thermosets, such as rubber, can also be injection molded. However, these materials have different properties than thermoplastics and must be treated differently in the molding process. For instance, to injection mold rubber it is typically heated to a relatively low initial temperature (on the order of about 150° F. to 200° F.) so that is pliable, although not molten or readily flowable, and can be injected into a mold. Once injected into the mold, the rubber cures as a function of its temperature and the time held at an elevated temperature. For instance, rubber will cure relatively rapidly at higher temperatures and will require longer curing times at lower temperatures. Thus, rubber cures in a very different way than thermoplastics and hence, requires a different injection molding process which has its own parameters and presents problems different from those involved in injection molding thermoplastics.

Prior systems for injection molding of rubber have used a single block of steel with the desired passages or runners formed therein to communicate the main injection nozzle with secondary nozzles through which the rubber is injected into the mold. To form the runners in the single block of steel a plurality of holes must be drilled and portions thereof subsequently plugged to prevent leakage from the block. Careful machining of the block to provide the runners is necessary to avoid sharp corners in the passages or runners which may inhibit the flow of the rubber material and eventually cause blockages of the runners.

Furthermore, the injection block is typically at a sufficiently elevated temperature to insure that the rubber remains pliable and can be injected into the mold. When the molding process is interrupted or stopped for a duration, the rubber within the injection block may begin to cure and block the runners preventing subsequent injection molding operations. Blockage of the runners also occurs throughout use of the injection block and especially around corners or other non-linear portions of the runners wherein the flow of rubber through the runners may be inconsistent or inhibited and some of the rubber begins to cure in the runners eventually causing a blockage. With the injection block formed of a single piece of steel, it is extremely difficult to adequately clear a blockage from a runner and often such blockages must be machined from the block, such as by drilling, which can damage the surface of the runners and may thereby cause subsequent blockages. Thus, with an injection block formed from a single piece of steel it is labor intensive and expensive to initially form the runner system therein and plug the open ends, and it is subsequently difficult, labor intensive and expensive to remove blockages from them and they are thus, costly to maintain.

Attempts to form a suitable injection block for the injection molding of rubber from multiple flat plates secured together by fasteners such as cap screws, such as has been done for the injection molding of thermoplastics, have been unsuccessful because after a period of use the fasteners break and the plates are forced apart and damaged. This problem is not encountered with the injection molding of thermoplastics which tend to flow more uniformly through the runners when in their generally molten condition such that the metal to metal seal between adjacent plates is sufficient to prevent the plastic from leaking or creeping between the plates.

SUMMARY OF THE INVENTION

It has been discovered that when injection molding rubber with an injector block having flat plates defining runner passages, the rubber material creeps between the adjacent plates. This is believed to increase the surface area on which the rubber acts under pressure thereby producing a tremendous force acting on the plates which breaks the fasteners, forces the plates apart and damages them. This force becomes so great that it is impossible as a practical matter to releasably fasten the plates together. It is believed this problem does not occur in injection molding of thermoplastic materials because they do not creep between adjacent plates of the injection block.

According to the present invention, an injection block is provided for the injection molding of thermoset polymers, such as rubber, formed from at least a pair of plates bolted or otherwise releasably held together and defining passages of a runner system between the plates. Generally complimentary grooves are formed in each plate to define, when the plates are mated together, an enclosure constructed to receive a sealing member therein to prevent the thermoset material being molded from leaking or creeping from the passage beyond the sealing member between the plates. By limiting the leaking or creeping of the molding material from the runners, the sealing member limits the surface area acted on by the relatively high pressure under which the thermoset material is molded to limit the force tending to separate the plates. With this limited force, the plates may be held together by a plurality of bolts without failure in use of the injection block. Bolting the plates together is desirable because it facilitates readily separating the blocks to clean the passages or otherwise service and maintain the injection block throughout its life.

Typically, the injection block communicates with a vertically disposed injection nozzle of an injection molding machine and distributes the material received from the nozzle through a plurality of runners to one or more secondary injection nozzles which inject the material into the mold. The runners extend initially generally horizontally or perpendicular to the main injection nozzle and then extend vertically through one plate to the secondary injection nozzles which are typically vertically disposed. To improve the flow from the horizontal to the vertical sections of the runners, the cross sectional area of the runner upstream of the turn from horizontal to vertical is reduced to increase the rate of flow of material through that section of the runners. Further, a pickup portion or upwardly more steeply, tapered lower surface of the runners is provided immediately upstream of the turn to direct the flow of material from that surface and generally towards the upper or radially outer surface of the turn of the runners. This improves the material flow around the turn and substantially prevents the stagnation of material in the passage adjacent to the turn to prevent material from curing over time in the runners.

Objects, features and advantages of this invention include providing an injection block for the injection molding of thermoset polymers such as rubber, which is formed of at least two separate plates, limits the creeping of material between the plates to limit the force tending to separate the plates, enables the plates to be releasably held together by a plurality of releasable fasteners such as bolts, facilitates cleaning of the runners and removal of any cured material or blockage therein, has runners designed to decrease the potential for blockages of the runners, can be used with high injection pressures of 20,000 psi or more, is of relatively simple design and economical manufacture and assembly and has a long and useful life.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
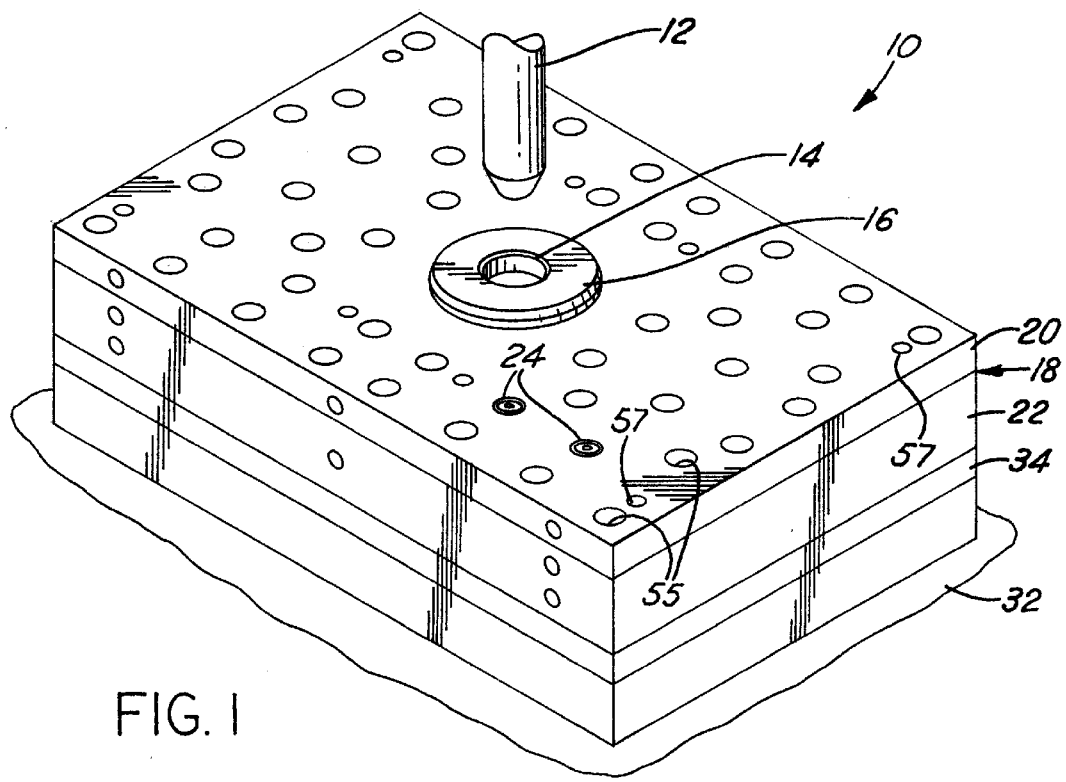
FIG. 1 is a perspective view of an injection block according to the present invention with a machine main injector nozzle disposed adjacent the block to inject a thermoset rubber polymer into the block.
Figure 2:
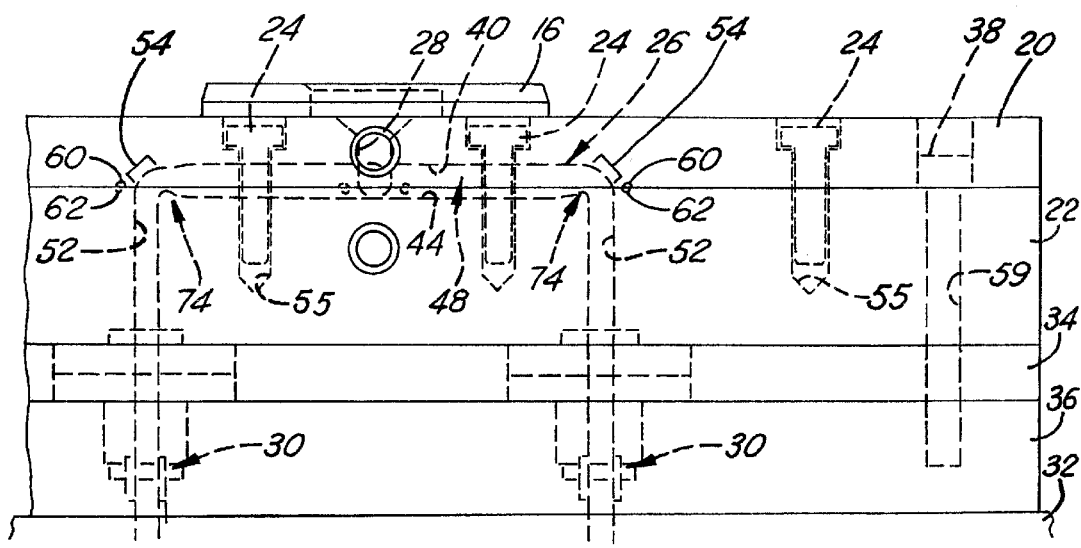
FIG. 2 is a partial side view of the injection block of FIG. 1.

Referring in more detail to the drawings, FIGS. 1 and 2 illustrate an injection molding assembly 10 constructed in accordance with the present invention to injection mold thermoset polymers such as rubber. A molding machine main injection nozzle 12 is constructed to be received on a generally spherical or conical seat 14 and may be machined or inserted directly into plate 20 and is surrounded by a locator ring 16 bolted to an injection block 18. The injection block 18 has an upper plate 20 releasably held on a lower plate 22 by a plurality of bolts or screws 24 to define between them a runner system 26 which communicates a main injection passage 28 with four secondary injection nozzles 30 through which the thermoset material is injected into a mold 32.

In use, normally the mold is heated to a higher temperature to cure the injected polymer then the temperature to which the injection block 18 is heated to promote flow and cure of the polymer from the machine nozzle 12 to a cavity of the mold. Thus, an insulating board 34 is preferably clamped between the lower plate 22 of the injection block 18 and an injector mounting plate 36 by a plurality of bolts or screws 38. The insulating board 34 insulates the injection block 18 from the injector mounting plate 36 which bears on the mold 32 or is mounted directly to the heated top plate of mold 32 and in use helps to maintain the temperature of the injection block 18 in a range suitable to enable the thermoset material to be moved through the runner system 26 under pressure but to prevent the material from curing within the injection block 18.

Figure 3:
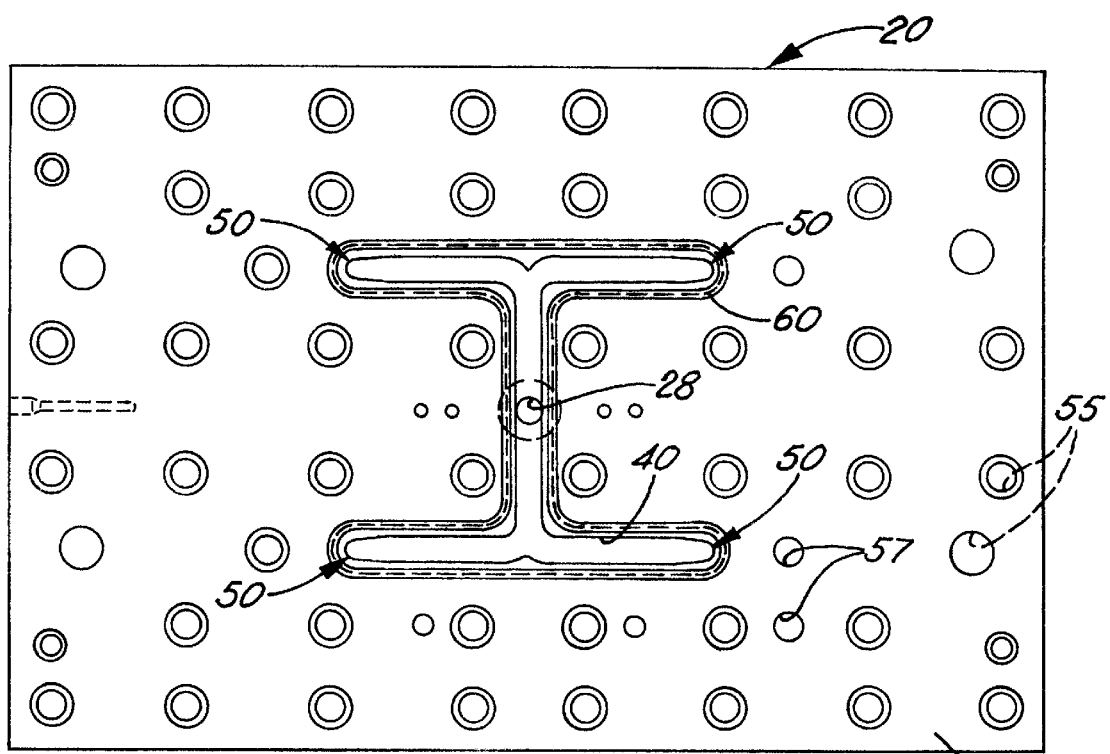
FIG. 3 is a bottom view of the top plate of the injection block of FIG. 1.
Figure 4:
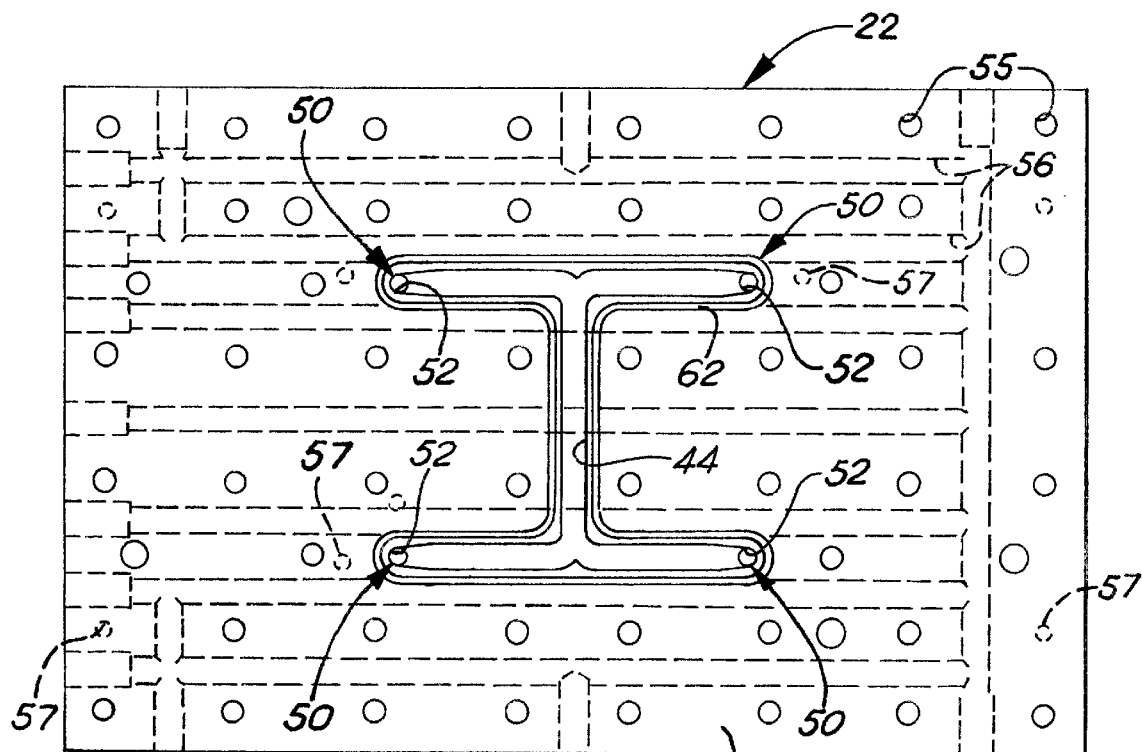
FIG. 4 is a plan view of the bottom plate of the injection block.
Figure 8:
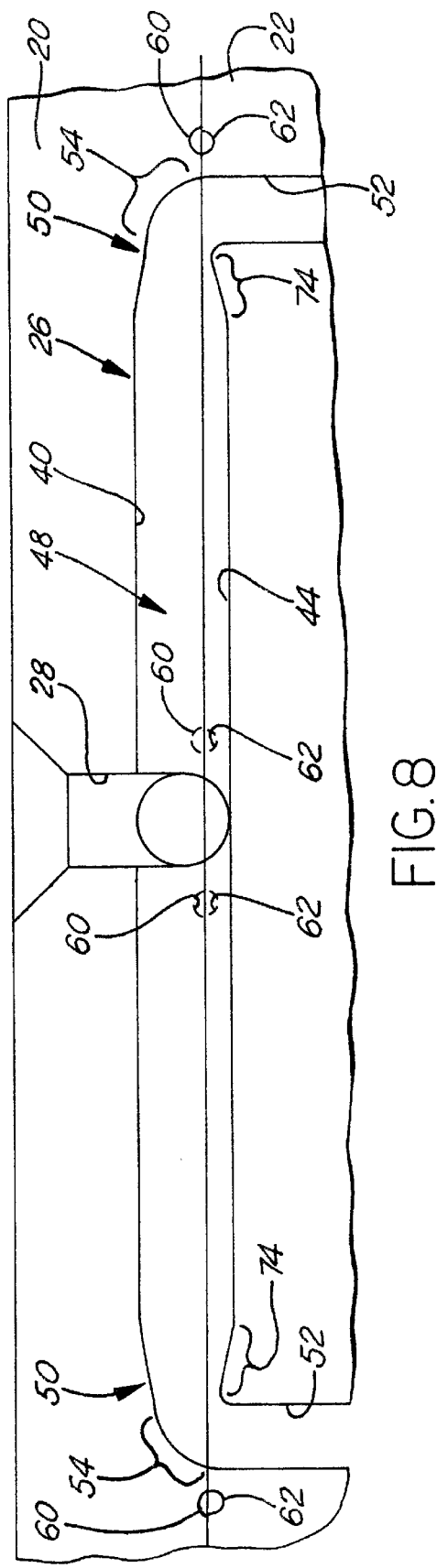
FIG. 8 is an enlarged partial cross-sectional view of the injection block illustrating a turn or transition of the runners from their horizontal to their vertical portions.
Figure 9:
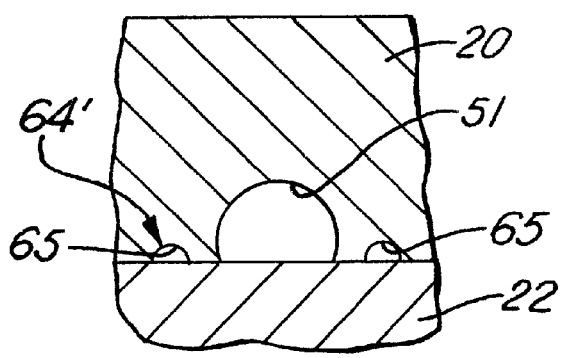
FIG. 9 is a partial cross sectional view of a modified injection block.

As shown in FIGS. 2 and 3, the upper plate 20 has the main injection passage 28 formed therein. The main injection passage 28 extends vertically through the upper plate and opens into a generally horizontal H-shaped recess 40 formed in the bottom surface 42 of the upper plate 20. As shown in FIG. 4, the lower plate 22 has a complimentary H-shaped recess 44 formed in its upper surface 46 such that when the upper plate 20 and lower plate 22 are mated together, the H-shaped recesses 40, 44 formed in each plate 20, 22 define an H-shaped runner cavity 48 (FIGS. 2, 5 and 8) which divides and directs the flow from the single machine main nozzle 12 to each end 50 of the cavity 48. Optionally, as shown in FIG. 9, the runner cavity may be defined by a recess 51 formed in only one of the upper plate 20 and lower plate 22 and by the opposed face of the other plate. At each end 50 of the cavity 48, as best shown in FIGS. 2 and 8, the runner cavity 48 opens into spaced apart passages 52 which extend generally vertically through the lower plate 22 to supply the material to the secondary injection nozzles 30. Thus, there is a curved transition portion or bend 54 in the runner system which joins the ends 50 of the generally H-shaped cavity 48 and the vertical passages 52 formed through the lower plate 22. Together, the cavity 48 and passages 52 define the runner system 26 through which the thermoset material flows from a single main injection nozzle 12 to each of four secondary nozzles 30 for injection into the mold 32. Some molds may have one or more secondary nozzles.

Preferably, a plurality of fluid passages 56 formed in both the upper plate 20 and lower plate 22 (shown in hidden lines in lower plate, FIG. 4) receive a circulating fluid to heat and control the temperature of the injection block 18 as desired for injection of the thermoset material. As shown in FIGS. 1–4, a plurality of holes 55 formed through the upper plate 20 and lower plate 22 are constructed to receive the cap screws 24 to connect and releasably secure together the upper plate 20 and lower plate 22. Various other holes 59 extending through the upper plate 20, lower plate 22, insulating board 34 and into the injector plate 36 or top plate or mold 32 to receive the cap screws 38 which connect and releasably secure together each of the plates 20, 22, 36 and the insulating board 34. Various smaller holes 57 may be provided to receive alignment pins (not shown) which facilitate aligning the various components in assembly.

Figure 10:
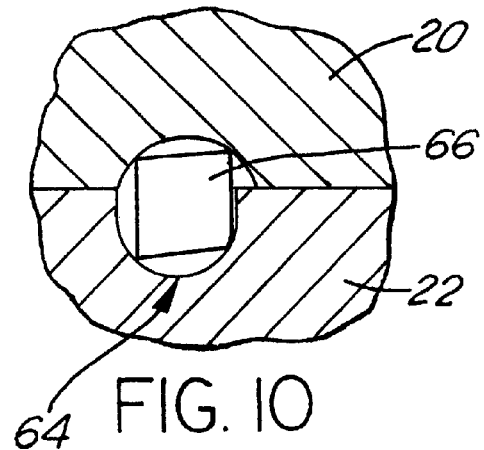
FIG. 10 is a partial cross sectional view illustrating a modified sealing member in an enclosure.

As best shown in FIG. 3, a continuous groove 60 is formed in the bottom surface 42 of the upper plate 20 surrounding and spaced from the outer periphery of the recess 40. Similarly, as shown in FIG. 4, a generally complimentary groove 62 is formed in the upper surface 46 of the lower plate 22 also spaced from and surrounding the outer periphery of its recess 44. When the upper plate 20 and lower plate 22 are mated together, the grooves 60, 62 define a passage or enclosure 64 constructed to receive a sealing member 66 such as a strip of material of Teflon, copper, steel, brass, silicone or the like, as well as some polymers, which substantially prevents any of the thermoset material to be molded which leaks or creeps into the enclosure 64 from leaking beyond the sealing member and the enclosure 64 between the upper plate 20 and lower plate 22. Optionally, as shown in FIG. 9, an enclosure 64' may be defined by a groove 65 formed in only one of the upper plate 20 and lower plate 22 and by the opposed face of the other plate. Preferably, the sealing member 66 is a generally round or circular shaped elongated member and may or may not deform under the pressure of the thermoset material in the enclosure 64. The sealing member 66 may be continuous or may be formed from an elongate strip of material bent to the shape of the enclosure with its opposed ends butted against each other or sealingly connected together. The sealing member 66 may be of any suitable shape capable of providing the desired seal such as, round, elliptical, or rectangular (as shown in FIG. 10) to name a few. Similarly, the sealing member 66 may be formed of a wide range of materials or composites suitable for use at the elevated temperatures at which the injection block is maintained in use. The noted materials and shapes are provided for illustrative purposes only and are not intended to limit the scope of this invention in any way. Regardless of the specific material or shape of the sealing member 66, or whether the sealing member 66 deforms in use, the sealing member 66 substantially prevents leakage of the thermoset material beyond the enclosure 64. By preventing leakage of the material beyond the enclosure 64, the total surface area over which the thermoset material under pressure acts between the plates 20, 22 tending to separate them, is limited. Thus, the plates 20, 22 may be releasably held together such as by the plurality of bolts or cap screws 24 as shown.

Figure 7:
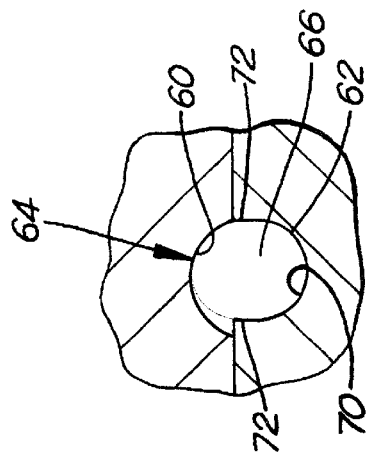
FIG. 7 is an enlarged cross-sectional view of the encircled portion 7 of FIG. 5.
Figure 6:
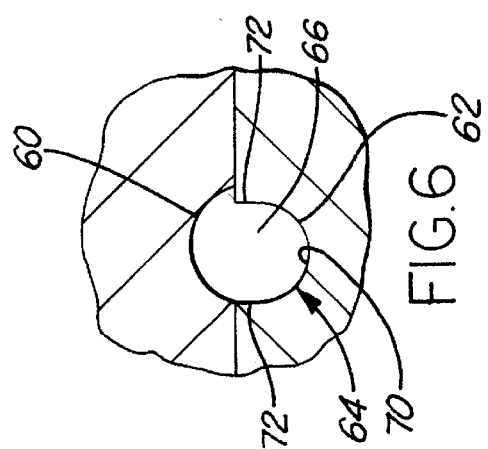
FIG. 6 is an enlarged cross-sectional view of the encircled portion 6 of FIG. 5.
Figure 5:
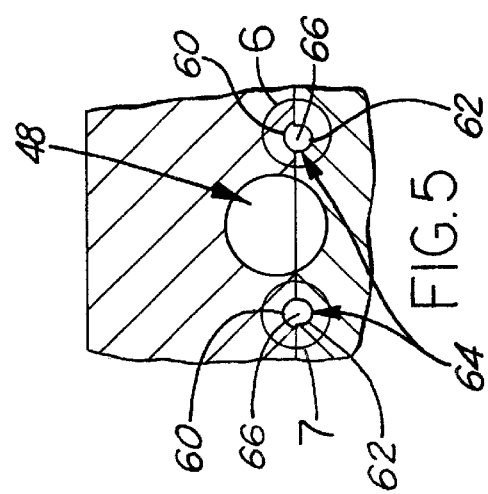
FIG. 5 is a partial cross sectional view of the injection block illustrating a runner between adjacent grooves.

Preferably, as shown in FIGS. 5–7, the groove 60 in the upper plate 20 is generally semi-circular in cross section. The groove 62 in the lower plate 22 is preferably defined by a bottom surface 70 which is generally semi-circular and offset somewhat from the upper surface 46 of the lower plate 22 providing generally straight edge sidewall 72 leading to the bottom surface 70 of the groove 62. In assembly, the sealing member 66 is preferably press-fit into the groove 62 in the lower plate 22. As shown, the groove 60 in the upper plate 20 preferably has a greater width than the groove 62 in the lower plate 22 to facilitate assembly of the upper plate 20 to the lower plate 22 and to prevent damage to the sealing member 66 when the plates 20, 22 are mated. This non-symmetrical construction of the grooves 60, 62 also substantially prevents the sealing member 66 from sticking in the groove 60 in the upper plate 20 as the plates 20, 22 are separated to facilitate separating the plates.

To improve the flow of the thermoset material through the runner system 26, and thereby prevent blockages due to the curing over time of stagnant material in the runner system 26, each end 50 of the cavity 48 is tapered providing a reduced cross-sectional area flow path adjacent to and upstream of each bend 54. The reduced flow path area provides an increased rate of flow of the material through and around each bend 54 joining the cavity 48 and passages 52. Additionally, as best shown in FIGS. 2 and 5, the lower surface of the cavity 48 defined by the recess 44 in the lower plate 22, has a pickup portion 74, immediately upstream of each bend 54, which is more steeply tapered and is constructed to direct the flow of the thermoset material towards the upper surface of the cavity 48, or the radially outer portion of the bend 54 defined by the recess 40 in the upper plate 20. This flow of material reduces or eliminates the stagnation of material adjacent the upper surface of the cavity 48 to prevent material adjacent or within each bend 54 from curing over time and eventually blocking the curved portion of the runner system 26. Thus, with the runner cavity 48 formed as described, the likelihood of blockages forming in use over time in the curved portion of runner system 26 is severely diminished if not eliminated to reduce the downtime of the injection block 18 in use.

With the injection block 18 of this invention, any blockages which occur in the runner system 26 and any polymer material remaining therein after a molding run may be easily removed by separating the upper plate 20 and lower plate 22 and cleaning the blocked portion and removing the material therein. The cavity 48 is very easy to clean when the plates 20, 22 are separated and the straight, vertical passages 52 through the lower plate 22 are likewise easier to clean than previous injection blocks and no plugs are required to seal off portions of various passages as in previous blocks formed from a single piece of steel. Thus, the injection block 18 formed from a pair of plates 20, 22 releasably secured together as described reduces the likelihood of blockages forming in the runner system 26 and facilitates maintaining, cleaning or removing any blockages and remaining polymer material from the runner system 26.

What is claimed is:

1. An injection block for the injection molding of thermoset polymers comprising:

a first plate;

a second plate releasably connected to the first plate;

a runner cavity defined between the first and second plates through which the thermoset material flows for subsequent injection into a mold;

an enclosure defined between the first and second plates surrounding the runner cavity;

a sealing member received within the enclosure defined between the first plate and second plate and constructed to prevent the leakage of the thermoset material beyond the enclosure between the first plate and second plate; and fasteners releasably securing the first and second plates together in assembled relationship.

2. The injection block of claim 1 wherein the first plate and second plate are releasably connected together by a plurality of bolts or screws.

3. The injection block of claim 1 wherein a portion of the runner cavity is formed in both the first plate and the second plate.

4. The injection block of claim 1 wherein a portion of the enclosure is formed in both the first plate and the second plate.

5. The injection block of claim 1 wherein the runner cavity is defined by a groove formed in one of the first and second plates and by a generally flat face of the other of the first and second plates.

6. The injection block of claim 1 wherein the enclosure is defined by a groove formed in one of the first and second plates and by a generally flat face of the other of the first and second plates.

7. The injection block of claim 1 wherein at least two separate passages are formed through the second plate in communication with and inclined from the runner cavity defined between the first plate and second plate to divide the flow of thermoset material from the runner cavity to each passage.

8. The injection block of claim 1 wherein the sealing member is a copper wire.

9. The injection block of claim 1 wherein the sealing member is formed of polytetrafluoethylene.

10. The injection block of claim 7 wherein four passages are formed in the second plate, each passage extends through the second plate and communicates with a separate portion of the runner cavity defined between the first plate and second plate to provide four separate flow paths for the thermoset material.

11. The injection block of claim 10 wherein the runner cavity formed between the first plate and the second plate is generally H-shaped providing four branches with each branch communicating with a separate passage.

12. The injection block of claim 7 wherein the cross-sectional area of the runner cavity defined between the first plate and second plate decreases adjacent each passage to increase the rate of flow of the thermoset material from the runner cavity to each passage which extends at an angle from the runner cavity.

13. The injection block of claim 12 wherein the cross-sectional area of the runner cavity decreases upstream of and toward each passage.

14. The injection block of claim 12 wherein the runner cavity is generally tapered adjacent each end portion to provide the decreased cross-sectional area.

15. The injection block of claim 14 wherein the lower portion of the runner cavity is more steeply tapered than the corresponding upper portion of the runner cavity.

16. The injection block of claim 7 which further comprises an injection nozzle mounting plate releasably connected to the second plate and having at least two injection nozzles mounted thereon, each injection nozzle communicates with a separate passage at one end and with an injection mold at its other end to inject the thermoset material into the injection mold.

17. The injection block of claim 16 which also comprises a layer of insulating material received between the injection nozzle mounting plate and the second plate to reduce the heat transfer between them.

18. The injection block of claim 1 wherein the sealing member is a substantially continuous wire which spans substantially the entire length of the enclosure.

19. The injection block of claim 1 wherein the sealing member is formed of a material which is deformable when acted upon by the thermoset material which enters the enclosure.

20. The injection block of claim 4 wherein the enclosure is defined by the grooves formed in each of the first and second plates and the groove formed in one of the plates is wider than the groove formed in the other plate.

21. The injection block of claim 20 wherein, in assembly, the sealing member is compressed in the groove formed in the second plate and the wider groove in the first plate facilitates connecting and separating the first plate and second plate.

* * * * *

UNITED STATES PATENT AND TRADEMARK OFFICE
CERTIFICATE OF CORRECTION

PATENT NO. : 6,179,603 B1
DATED : January 30, 2001
INVENTOR(S) : Robert R. Kring It is certified that error appears in the above-identified patent and that said Letters Patent is hereby corrected as shown below:

<u>Title page,</u>
Add: [73] Wirtz Manufacturing Co., Inc., Port Huron, MI (US)
      [74] Attorney, Agent, or Firm -- Reising, Ethington, Barnes, Kisselle, Learman & McCulloch, P.C.

Signed and Sealed this

Twenty-first Day of August, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,179,603 B1
DATED : January 30, 2001
INVENTOR(S) : Richard R. Kring It is certified that error appears in the above-identified patent and that said Letters Patent is hereby corrected as shown below:

<u>Title page,</u>
Add: [73] Wirtz Manufacturing Co., Inc., Port Huron, MI (US)
    [74] Attorney, Agent, or Firm -- Reising, Ethington, Barnes, Kisselle, Learman & McCulloch, P.C. --

This certificate supersedes Certificate of Correction issued August 21, 2001.

Signed and Sealed this

Tenth Day of September, 2002

*Attest:*

*Attesting Officer*

JAMES E. ROGAN
*Director of the United States Patent and Trademark Office*